United States Patent [19]

Scherner et al.

[11] Patent Number: 5,382,194
[45] Date of Patent: Jan. 17, 1995

[54] PLUG-IN AXIALLY AND ANGULARLY YIELDABLE TOOTHED COUPLING FOR TRANSMITTING TORQUE

[75] Inventors: Helmut Scherner, Ibbend/ ren; Reinhard Wibbeling, Hörstel; Josef Schürhörster, Rheine, all of Germany

[73] Assignee: KTR Kupplungstechnik GmbH, Rheine, Germany

[21] Appl. No.: 683,485

[22] Filed: Apr. 9, 1991

Related U.S. Application Data

[63] Continuation of Ser. No. 512,099, Apr. 10, 1990, abandoned, which is a continuation of Ser. No. 268,174, Nov. 7, 1988, abandoned.

[51] Int. Cl.$^6$ .................................... F16D 3/50
[52] U.S. Cl. ...................... 464/92; 464/96; 464/154; 464/159; 464/901
[58] Field of Search ............... 464/87–89, 464/91, 92, 96, 147, 153, 154, 158, 159, 162, 901; 192/106.1

[56] References Cited

U.S. PATENT DOCUMENTS

| | | | |
|---|---|---|---|
| 2,234,443 | 3/1941 | MacBeth | 192/106.1 |
| 2,592,309 | 2/1952 | Meier | 464/96 X |
| 2,699,656 | 1/1955 | Anderson et al. | 464/88 |
| 2,742,769 | 2/1956 | Gleeson et al. | 464/92 |
| 2,873,010 | 2/1959 | Alma | 464/92 X |
| 3,807,195 | 4/1974 | Faulbecker | 464/173 |
| 4,304,501 | 12/1981 | Gordon et al. | 464/154 X |
| 4,384,858 | 5/1983 | Krönert et al. | 464/56 |
| 4,664,642 | 5/1987 | Kirschey | 464/96 |
| 4,693,354 | 9/1987 | Umeyama et al. | 192/106.1 |
| 4,708,514 | 11/1987 | Walter et al. | 464/92 X |

FOREIGN PATENT DOCUMENTS

| | | | |
|---|---|---|---|
| 672591 | 3/1939 | Germany | 464/89 |
| 739273 | 6/1980 | U.S.S.R. | 464/88 |

*Primary Examiner*—Daniel P. Stodola
*Attorney, Agent, or Firm*—Darby & Darby

[57] ABSTRACT

A yieldable coupling wherein an externally toothed hub which can transmit torque to a rotary driven unit mates with an internally toothed sleeve forming part of a flange further having a support connectable to the output element of a rotary driving unit and an elastomeric connector between the support and the sleeve. The connector can include one or more rubber rings which are vulcanized to the adjacent components of the flange. A needle bearing or a friction bearing can be interposed between the hub and the connector.

20 Claims, 2 Drawing Sheets

PLUG-IN AXIALLY AND ANGULARLY YIELDABLE TOOTHED COUPLING FOR TRANSMITTING TORQUE

This application is a continuation of application Ser. No. 07/512,099, filed Apr. 10, 1990, now abandoned, which is a continuation of application Ser. No. 07/268,174, now abandoned.

BACKGROUND OF THE INVENTION

The invention relates to torque transmitting apparatus in general, and more particularly to improvements in axially and angularly yieldable elastic couplings which can transmit torque between misaligned rotary driving and driven units. Still more particularly, the invention relates to improvements in so-called plug-in axially and angularly yieldable elastic couplings wherein a flange-like component transmits torque to a hub-like component or vice versa through the medium of mating annuli of internal and external teeth.

Certain heretofore known elastic couplings which are used for transmission of torque between rotary driving and driven units whose axes are angularly and/or radially offset relative to each other and/or which move axially toward each other employ elastic rings which are subjected to torsional shearing stresses. Such rings are designed to compensate for pronounced radial displacement of the axes of driving and driven units relative to each other, and they are capable of transmitting relatively small restoring forces. The elastic rings of the just described conventional elastic couplings are installed between pairs of steel flanges which are secured to the driving unit. The flanges are further connected, normally by screws or bolts, with an internally toothed sleeve which serves to transmit torque to the driven unit by way of an externally toothed hub. The teeth of the hub are crowned in order to compensate for eventual inclination of the axes of rotation of the driving and driven units relative to each other. A drawback of such couplings is that the housing of the driving unit must be provided with openings for the aggregate including the steel flanges, the elastic ring between the flanges and the internally threaded sleeve which is bolted or screwed to the flanges. Moreover, the coupling cannot be fully assembled in the manufacturing plant, i.e., it is necessary to complete the assembly of the coupling at the locus of use in a time-consuming operation.

In accordance with another prior proposal, an axially and/or otherwise yieldable coupling for transmission of torque between misaligned rotary driving and driven units employs bolts or screws as a means for connecting a flange with a hub. The flange has an elastomeric ring which must take up all axial, radial and torsional stresses. A drawback of such couplings is that they must be installed between driving and driven units in a time-consuming operation. Moreover, the ring generates pronounced reaction forces when it is called upon to undergo compressive stresses, i.e., when its rigidity increases well above the average value.

Attempts to overcome the drawbacks of the just described prior couplings include the utilization of pins or studs which can be mounted at the radially innermost or at the radially outermost part of the coupling. The pins are insertable into a flange and into the part which is adjacent the flange in assembled condition of the coupling. Such pins and the holes or bores therefor must be machined with a high degree of precision which contributes to the initial cost of the coupling. The same applies for the making of the flange or flanges and of the adjacent parts. Moreover, it is necessary to provide the pins with layers of plastic material in order to reduce the likelihood of corrosion as a result of friction in actual use of the coupling. The pins are capable of compensating for axial movements of the driving and driven parts relative to each other. Angular displacements must be taken up by elastomeric parts which are provided in addition to the pins.

In accordance with still another prior proposal, the crowned teeth of the hub on the driven unit are placed into direct mesh with internal teeth of a plastic flange which, in turn, is directly affixed to the output element of the driving unit by screws or like fasteners. Such coupling exhibits the advantage that the housing of the driving unit need not be provided with an opening for the flange. The housing surrounds the outermost portion of the flange which can be placed into torque transmitting engagement with the hub as a result of insertion of the hub into the flange so that the crowned teeth of the hub mate with the internal teeth of the flange. A drawback of this coupling is that it does not permit any angular displacements of the hub and flange relative to each other. Moreover, the plastic flange is incapable of compensating for vibratory and other stray movements.

OBJECTS OF THE INVENTION

An object of the invention is to provide a novel and improved elastic coupling which exhibits the advantages but avoids the drawbacks of conventional elastic couplings.

Another object of the invention is to provide a plug-in type axially, radially and/or angularly yieldable elastic coupling whose elasticity or yieldability can be selected at will and which is capable of transmitting torque between driving and driven units whose axes are angularly and/or otherwise offset relative to each other.

A further object of the invention is to provide an elastic coupling which is practically noiseless and which can be installed between existing driving and driven units as a superior substitute for heretofore known elastic couplings.

An additional object of the invention is to provide an elastic coupling which comprises a relatively small number of simple parts, which can be fully assembled at the manufacturing plant and which can be dismantled in a simple and time-saving manner.

Still another object of the invention is to provide an elastic coupling wherein the plug-in connection between the constituents of the coupling can compensate, either entirely or to a large extent, for misalignments of the driving and driven units relative to each other.

A further object of the invention is to provide a novel and improved flange for use in the above outlined elastic coupling.

Another object of the invention is to provide a novel and improved method of transmitting torque between misaligned rotary driving and driven units.

SUMMARY OF THE INVENTION

The invention is embodied in a plug-in elastic axially and angularly yieldable coupling for transmission of torque between driving and driven units. The improved coupling comprises a hub which is connectable (e.g., by splines) to one of the units and has an annulus of external teeth, and a flange which is connectable to the other of the two units and includes a support, a sleeve having an annulus of internal teeth movable into and out of mesh with the annulus of external teeth, and an elastomeric connector between the support and the sleeve. One of the annuli preferably comprises crowned teeth. As a rule, or at least in many instances, the flange is arranged to transmit torque to the hub.

The connector can include a ring which is bonded (particularly vulcanized) to the support and to the sleeve. The support can consist of or contain a metallic or a plastic material, the same as the sleeve. At the present time, the sleeve is preferably made of or contains a plastic material. For example, the sleeve and/or the support can constitute an injection molded plastic component.

The support can comprise an internal gear and an external gear which mates with the internal gear. The connector is then bonded to one of the gears and to the sleeve. It is presently preferred to bond the connector to the internal gear which latter can be coaxial with and mirror symmetrical to the sleeve.

The connector can comprise two coaxial rings of rubber or another suitable elastomeric material, and the flange of such coupling can further comprise threaded fastener means connecting the rings to each other. At least one of the rings can be rotatably mounted on the hub, and a bearing (such as a needle bearing or a friction bearing) can be installed between the at least one ring and the hub.

The hub can be made of or can contain a sintered metal.

The support of the flange can include or constitute a washer or a washer-like portion, and such washer-like portion can be provided with openings for bolts, screws or other suitable fasteners which serve to secure the support to the respective (driving or driven) unit.

The novel features which are considered as characteristic of the invention are set forth in particular in the appended claims. The improved coupling itself, however, both as to its construction and the mode of assembling the same, together with additional features and advantages thereof, will be best understood upon perusal of the following detailed description of certain specific embodiments with reference to the accompanying drawing.

DESCRIPTION OF PREFERRED EMBODIMENTS

Figure 1:
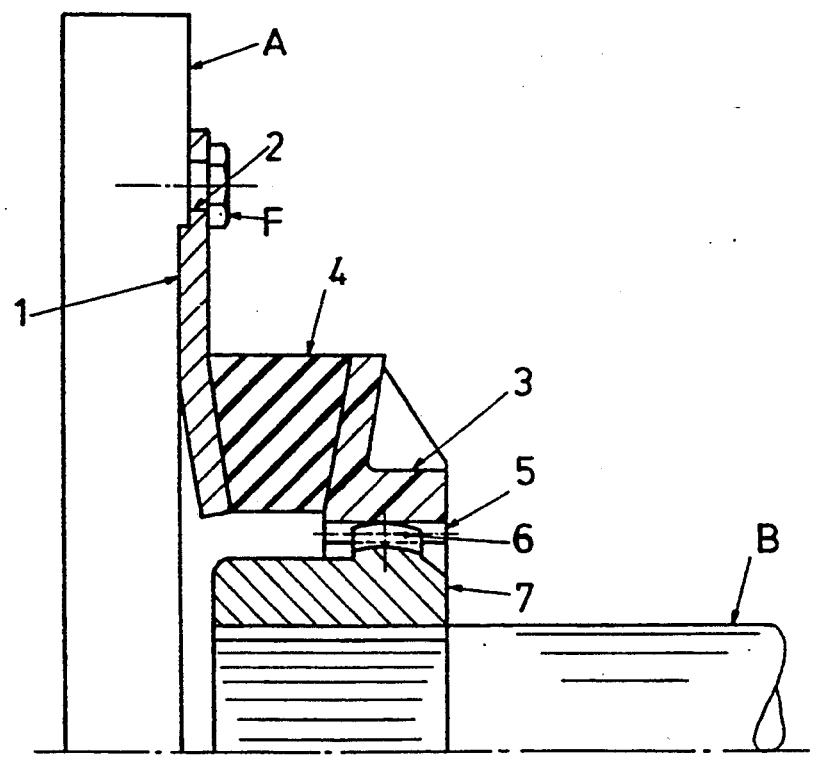
FIG. 1 is a fragmentary axial sectional view of a coupling which embodies one form of the invention and comprises a metallic one-piece support and a one-piece elastomeric connector.

The coupling which is shown in FIG. 1 comprises two main components, namely, a hub 7 which is non-rotatably mounted on a driven unit B and has an annulus of crowned external teeth 6, and a flange including a plastic sleeve 3 having an annulus of internal teeth 5 which are movable axially of the hub 7 into and out of mesh with the external teeth 6 of the hub 7, a washer-like support 1 which is provided with a set of circularly arranged or otherwise distributed openings 2, and an elastomeric connector 4 (e.g., a rubber ring) which is bonded (preferably vulcanized) to the adjacent surfaces of the support 1 and sleeve 3. The openings 2 receive the shanks of screws, bolts or other suitable fasteners F serving to separably connect the support 1 (and hence the entire flange including the components 1, 3 and 4) to a driving unit A whose axis of rotation may but need not coincide exactly with the axis of the driven unit B. The driving unit A can constitute a one-piece or composite flywheel on the crankshaft of an internal combustion engine, and the unit B can constitute the input shaft of a transmission in a motor vehicle. The openings 2 are preferably equidistant from each other in the circumferential direction of the support 1, and the latter can constitute a metallic component. The sleeve 3 consists of or contains a plastic material and can be made in an injection molding machine. If the support 1 is a plastic component, it can also constitute a one-piece injection molded article.

The extent to which the improved coupling is yieldable in the axial and/or radial direction and/or angularly depends upon the elasticity and/or dimensions and/or configuration of the connector 4.

An important advantage of the improved coupling is that it can be assembled or taken apart with little loss in time and without the need for resorting to complex tools. All that is necessary is to plug the externally toothed hub 7 into the sleeve 3 of the flange before or after the hub 7 is non-rotatably connected to the driven unit B. To this end, the driven unit B can be provided with external splines receivable in internal grooves of the hub 7. The arrangement is preferably (or can be) such that the support 1 is affixed to the driving unit A, that the hub 7 is slipped onto the unit B, and that the hub 7 is thereupon plugged into the flange including the sleeve 3, connector 4 and support 1 (or the flange is slipped onto the hub).

The improved coupling can transmit torque between the units A and B even if the axis of the unit A is slightly inclined with reference to the axis of the unit B as well as if the axis of the unit A is parallel to the axis of the unit B. In fact, the mating annuli of teeth 6 and 5 even permit a reasonably large extent of radial offset of the axes of the units A and B relative to each other. Still further, the connector 4 is capable of undergoing axial expansion and contraction so as to compensate for eventual movements of the units A and B toward or away from each other.

Another important advantage of the improved coupling is that the flange including the parts 1, 3 and 4 can be assembled into a prefabricated section of the coupling at the manufacturing plant so that it is not necessary to bolt, pin or otherwise secure the parts of the flange to each other at the locus of actual use. Moreover, the sleeve 3 need not be weakened by bores, holes, sockets or other forms of recesses; all that is necessary is to bond this sleeve to the connector 4. Injection molding of the sleeve 3 from a suitable plastic material contributes significantly to a reduction of the cost of the coupling. The thus produced sleeve need not be subjected to any secondary treatment, i.e., it is immediately ready to be vulcanized or otherwise reliably bonded to the connector 4.

The hub 7 is or can be made of a sintered metal. This is desirable and advantageous because it is not necessary to lubricate the teeth 6 and/or 5.

Figure 2:
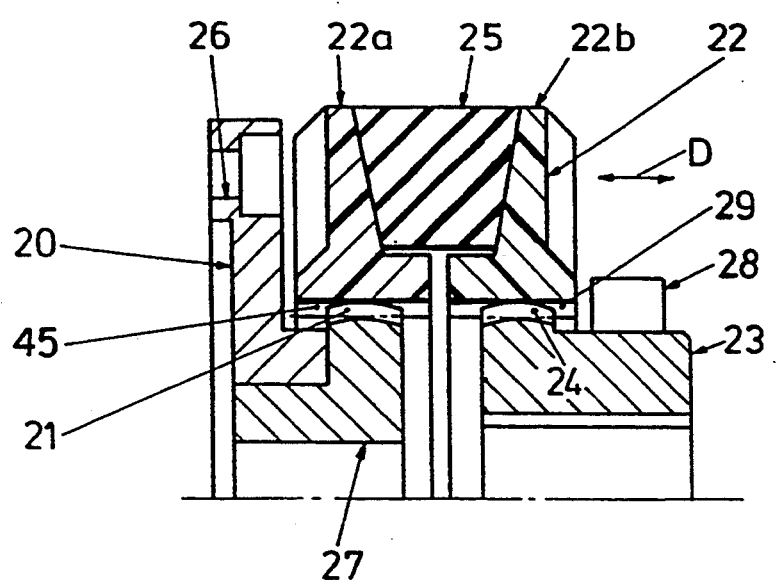
FIG. 2 is a fragmentary axial sectional view of a second coupling wherein the support comprises an internal gear and an external gear and wherein the connector of the flange is disposed between one of the gears and the sleeve.

FIG. 2 shows a portion of a modified coupling which includes a hub 23 having an annulus of crowned external teeth 24 and an abutment or stop 28. A composite flange 22 is reciprocable in directions indicated by a double-headed arrow D. The manner in which the hub 23 can be mounted on a driven unit (not shown) and in which the support of the flange 22 can be secured to a driving unit (not shown) by a set of screws, bolts or other suitable fasteners is or can be the same as described in connection with FIG. 1. The flange 22 comprises a plastic sleeve 22b having an annulus of internal teeth 29 which mate with the external teeth 24 of the hub 23, a ring-shaped connector 25 (e.g., a rubber ring) which is bonded (particularly vulcanized) to the adjacent side of the sleeve 22b, and a two-piece support including a first gear 20 with external teeth 21 and a second gear 22a having internal teeth 45 in mesh with the external teeth 21. The gear 20 has a set of preferably equidistant openings 26 for the aforediscussed fasteners which serve to secure the flange 22 to a driving unit. It will be noted that the two-piece support including the gears 20 and 22a consists in part of a metallic material (note the gear 20) and in part of a plastic material (note the gear 22a). The latter is preferably coaxial with and is a mirror image of the sleeve 22b. The connector 25 is bonded (preferably vulcanized) to the adjacent side of the gear 22a. The gear 20 can be made of two pieces one of which constitutes or resembles a washer with openings 26 and the other of which constitutes or resembles a spur gear 27 with teeth 21. The teeth 21 are crowned. The structure which is shown in FIG. 2 can be said to constitute a double cardanic coupling whose yieldability in the radial, axial and angular directions is even more pronounced than that of the coupling which is shown in FIG. 1. The means for non-rotatably securing the spur gear 27 to the washer of the support 20 can include bolts, screws or any other suitable torque transmitting means.

The coupling of FIG. 2 can be used with particular advantage between driving and driven units whose axes of rotation make a relatively large angle or are radially offset to such an extent that a single cardanic type coupling could not be used for reliable transmission of torque. The abutment or stop 28 on the hub 23 determines the extent of axial movability of the hub 23 and flange 22 toward each other.

Figure 3:
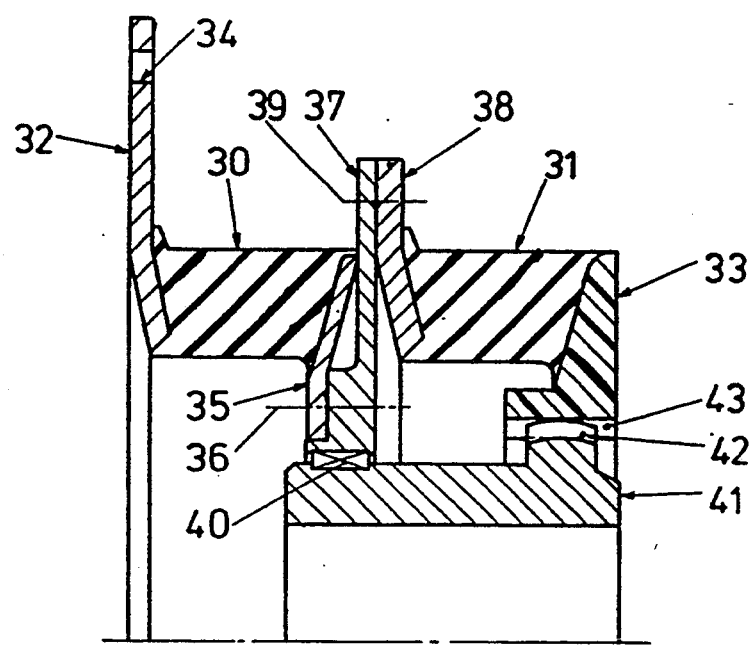
FIG. 3 is a fragmentary axial sectional view of a third coupling wherein the connector has two rings which are connected to each other by threaded fastener means and one of which is rotatably mounted on the hub.

The coupling of FIG. 3 comprises a hub 41 with an annulus of external teeth 42 and a flange having a sleeve 33 including an annulus of internal teeth 43 in mesh with the external teeth 42, a washer-like support 32 with a set of preferably equidistant openings 34 for fasteners (not shown), and a composite connector between the support 32 and sleeve 33. The connector includes two coaxial rings 30, 31 of rubber or other suitable elastomeric material. The ring 30 is bonded (e.g., vulcanized) to the adjacent side of the support 32 and to a first washer-like carrier 35. The ring 31 is bonded (e.g., vulcanized) to the adjacent side of the sleeve 33 and to the adjacent side of a second washer-like carrier 38. The radially outermost portion of the second carrier 38 is secured to a washer-like intermediate member 37 by a set of nuts and bolts (one indicated by the phantom line 39), and the radially innermost portion of the first carrier 35 is secured to the intermediate member 37 by a set of bolts and nuts (one indicated by the phantom line 36) or other suitable fasteners. The parts 36, 37, 39 can be said to constitute fastener means for securing the carriers 35, 38 (and hence the rings 30, 31) to each other.

The ring 30 and/or 31 is rotatably mounted on the hub 41 to enhance the stability of the coupling. As shown in FIG. 3, these rings are indirectly mounted on the hub 41 with the interposition of a bearing, such as a needle bearing 40, which is installe between the periphery of the hub 41 and the intermediate member 37. The latter can be considered an integral part of the ring 30 and/or 31. If desired, the needle bearing 40 can be replaced with a simple cylindrical friction bearing or with a conventional antifriction ball or roller bearing.

An advantage of the coupling which is shown in FIG. 3 is that its serially connected elastomeric rings 30, 31 enhance the ability of the hub 41 to change its inclination relative to the support 32 and/or vice versa. The elasicity, dimensions and/or other parameters of the ring 30 may but need not be the same as those of the ring 31.

The bearing 40 constitutes a desirable but optional feature of the coupling which is shown in FIG. 3. The teeth 42 of the hub 41 can be crowned.

The improved coupling can be used for transmission of torque from the flange to the hub or vice versa.

Figure 4:
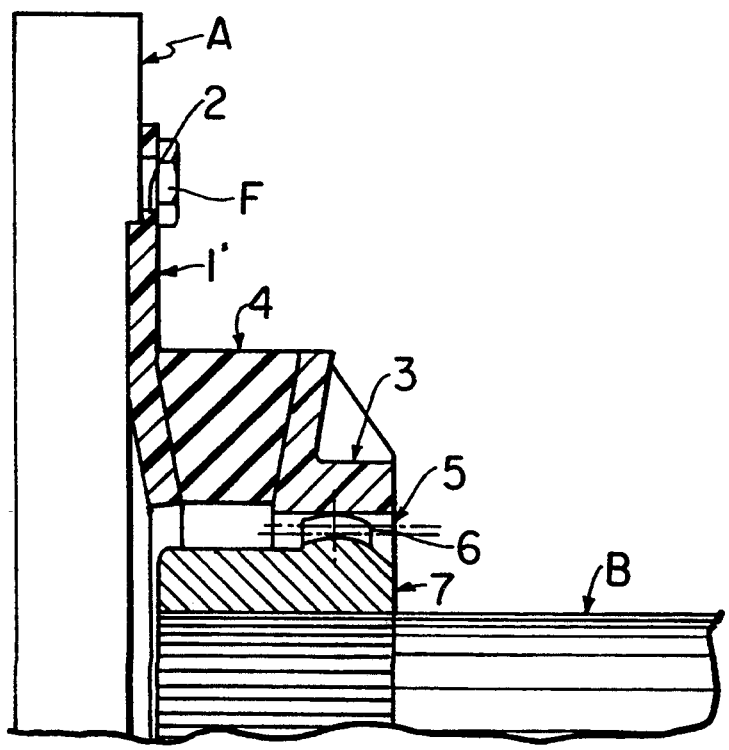
FIG. 4 is similar to FIG. 1 but shows a support made of plastic.

The coupling of FIG. 4 is similar to that of FIG. 1. However, while FIG. 1 shows a support 1 made of metal, the support 1' of FIG. 4 constitutes an injection molded plastic component.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A plug-in elastic axially and angularly yieldable coupling for transmission of torque between driving and driven units, comprising a hub having an axis and being connectable to one of the units and including an annulus of external teeth; and a flange connectable to the other of the units and including a support, a plastic sleeve having an annulus of internal teeth in mesh with the annulus of external teeth, and an elastomeric connector joining said support to said sleeve with limited freedom of movement in the axial, radial and angular directions of said hub, said hub and said sleeve being substantially unrestricted at all times against relative displacement in the general direction of said axis in a sense to move said internal and external teeth out of mesh with one another.

2. The coupling of claim 1, wherein said flange is arranged to transmit torque to said hub.

3. The coupling of claim 1, wherein said connector includes a ring which is bonded to said support and to said sleeve.

4. The coupling of claim 1, wherein said connector is vulcanized to said support and to said sleeve.

5. The coupling of claim 1, wherein said support contains a metallic material.

6. The coupling of claim 1, wherein said support contains a plastic material.

7. The coupling of claim 1, wherein said support and said sleeve have facing surfaces which extend generally radially of said axis, said connector being bonded to said surfaces.

8. The coupling of claim 1, wherein said support comprises an internal gear and an external gear mating with said internal gear, said connector being bonded to one of said gears and to said sleeve.

9. The coupling of claim 8, wherein said one gear is said internal gear and said one gear is coaxial with and mirror symmetrical to said sleeve.

10. The coupling of claim 1, wherein said connector comprises two coaxial rings.

11. The coupling of claim 10, wherein said flange further comprises threaded fastener means connecting said rings to each other.

12. The coupling of claim 10, wherein at least one of said rings is mounted on said hub for rotation relative thereto.

13. The coupling of claim 12, further comprising a bearing supporting said at least one ring for rotation relative to said hub.

14. The coupling of claim 13, wherein said bearing is a needle bearing.

15. The coupling of claim 1, wherein one of said annuli has crowned teeth.

16. The coupling of claim 1, wherein said hub contains a sintered metal.

17. The coupling of claim 1, wherein said sleeve is an injection molded plastic component.

18. The coupling of claim 1, wherein said support includes a washer.

19. The coupling of claim 1, wherein said support is an injection molded plastic component.

20. The coupling of claim 1, wherein said support includes a washer-like portion having openings for fasteners which secure said support to the respective unit.

* * * * *

UNITED STATES PATENT AND TRADEMARK OFFICE
CERTIFICATE OF CORRECTION

PATENT NO. : 5,382,194
DATED : January 17, 1995
INVENTOR(S) : Helmut SCHERNER; Reinhard WIBBELING and Josef SCHURHORSTER It is certified that error appears in the above-indentified patent and that said Letters Patent is hereby corrected as shown below:

On the title page, item [75], change "Ibbend/ ren to --Ibbenduren--.

Signed and Sealed this

Twenty-first Day of March, 1995

BRUCE LEHMAN

Attest:

*Attesting Officer*            *Commissioner of Patents and Trademarks*